United States Patent
Okamoto et al.

(10) Patent No.: US 6,767,661 B2
(45) Date of Patent: Jul. 27, 2004

(54) FUEL CELL SYSTEM AND METHOD FOR OPERATING THE SAME

(75) Inventors: Takafumi Okamoto, Koshigaya (JP); Masahiro Ise, Asaka (JP); Shuji Sato, Kawagoe (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 496 days.

(21) Appl. No.: 09/947,686

(22) Filed: Sep. 6, 2001

(65) Prior Publication Data

US 2002/0051900 A1 May 2, 2002

(30) Foreign Application Priority Data

Sep. 6, 2000 (JP) .......................... 2000-270722

(51) Int. Cl.[7] .............................................. H01M 8/18
(52) U.S. Cl. ........................ 429/20; 429/22; 429/24; 429/26; 429/32; 429/38; 429/39; 429/13; 429/17
(58) Field of Search ................ 429/13, 17, 20, 429/22, 24, 26, 32, 38, 39

(56) References Cited

U.S. PATENT DOCUMENTS

| | | | |
|---|---|---|---|
| 5,302,471 A | * | 4/1994 | Ito et al. ...................... 429/24 |
| 5,541,015 A | * | 7/1996 | Tajima et al. ................. 429/26 |
| 6,093,500 A | * | 7/2000 | Margiott et al. .............. 429/13 |
| 6,120,923 A | * | 9/2000 | Van Dine et al. ............. 429/17 |
| 6,519,510 B1 | * | 2/2003 | Margiott et al. ............ 700/299 |

FOREIGN PATENT DOCUMENTS

JP 64-01027164 A 1/1989

* cited by examiner

Primary Examiner—Bruce F. Bell
(74) Attorney, Agent, or Firm—Lahive & Cockfield, LLP; Anthony A. Laurentano (57) ABSTRACT

A fuel cell system comprises a medium-circulating passage for supplying, in a circulating manner, a temperature-adjusting medium to a fuel cell stack, and first and second temperature sensors for detecting medium temperatures at a temperature-adjusting medium inlet and a temperature-adjusting medium outlet. The medium-circulating passage is provided with a pump for circulating the medium, a heater for heating the medium, a radiator for cooling the medium, a bypass passage for bypassing the radiator, and first through third opening/closing valves for selectively supplying the temperature-adjusting medium to the radiator and the bypass passage.

7 Claims, 5 Drawing Sheets

FUEL CELL SYSTEM AND METHOD FOR OPERATING THE SAME

RELATED APPLICATIONS

This application claims priority to Japanese Patent Application No. 2000-270722 filed on Sep. 6, 2000 in Japan. The contents of the aforementioned application are hereby incorporated by reference.

BACKGROUND OF THE INVENTION

1. Field of the Invention

The present invention relates to a fuel cell system provided with a phosphoric acid fuel cell stack including a plurality of stacked power-generating cells each having a joined unit including an electrolyte impregnated with phosphoric acid and interposed between an anode electrode and a cathode electrode in which the joined unit is interposed between separators. The present invention also relates to a method for operating the fuel cell system.

2. Description of the Related Art

For example, the phosphoric acid fuel cell (PAFC) has a power-generating cell constructed such that a joined unit, which comprises an anode electrode and a cathode electrode principally composed of carbon respectively and provided opposingly on both sides of an electrolyte layer composed of a silicon carbide porous member (matrix) impregnated with concentrated phosphoric acid, is interposed between separators (bipolar plates). Usually, a predetermined number of the power-generating cells are stacked to be used as a fuel cell stack.

In such a fuel cell stack, a fuel gas such as a gas principally containing hydrogen (hereinafter referred to as "hydrogen-containing gas" as well), which is supplied to the anode electrode, contains hydrogen which is ionized into ion on the catalyst electrode, and the ion is moved toward the cathode electrode via the electrolyte. The electron, which is generated during this process, is extracted for an external circuit, and the electron is utilized as DC electric energy. An oxygen-containing gas, for example, a gas principally containing oxygen (hereinafter referred to as "oxygen-containing gas" as well) or air is supplied to the cathode electrode. Therefore, the hydrogen ion, the electron, and the oxygen are reacted with each other on the cathode electrode, and thus water is produced.

In general, in the case of the phosphoric acid fuel cell, the power generation is performed at a rated output (rated load) in a state in which the operating temperature is relatively high (about 120° C. to 200° C.). The product water, which is generated during the operation, is converted into steam which is discharged to the outside. However, if the phosphoric acid fuel cell is operated in a state of low load, the amount of self-heat generation of the phosphoric acid fuel cell is lower than the amount of heat release, resulting in the decrease in temperature of the phosphoric acid fuel cell. As a result, the product water, which has been evaporated at a high temperature, is pooled as liquid water in the electrolyte layer. A large amount of liquid water, which can not be kept in the electrolyte layer and the electrode, may be introduced into the reaction gas flow passage.

However, the phosphoric acid of the electrolyte layer has extremely high hydrophilicity. The phosphoric acid may flow out from the electrolyte layer and the electrode together with the liquid water introduced into the reaction gas flow passage. For this reason, the phosphoric acid is deficient in the electrolyte layer, the power generation performance of the power-generating cell is lowered, and the service life of the fuel cell itself is shortened.

Figure 5:
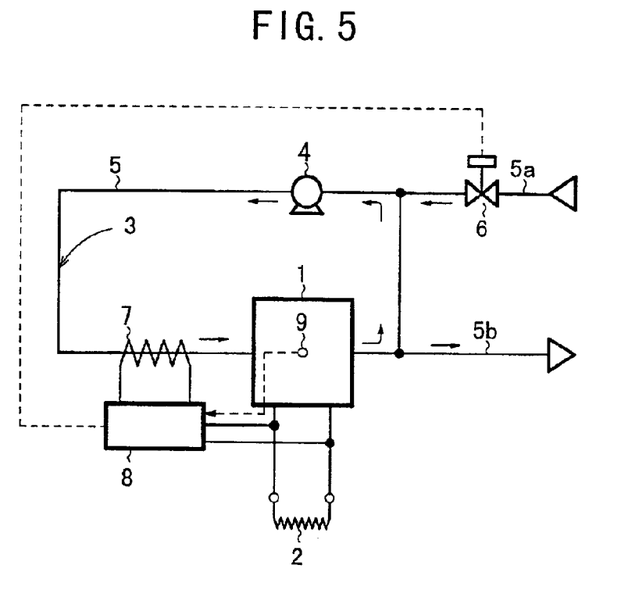
FIG. 5 illustrates a schematic arrangement of a conventional fuel cell.

In order to solve the problem of this type, an operating temperature control apparatus for a fuel cell is known, as disclosed, for example, in Japanese Laid-Open Patent Publication No. 64-27164. In this conventional technique, as shown in FIG. 5, a load 2 such as a motor is connected to output terminals (collecting electrodes) of a main cell body 1 of a fuel cell. A cooling system 3 for supplying cooling air into the main cell body 1 is arranged and connected to the main cell body 1. The cooling system 3 comprises an air-circulating tube passage 5 which includes a blower 4, an intake tube passage 5$a$ which is branched from the air-circulating tube passage 5 and which is open to the atmospheric air via a variable damper 6, and a discharge tube passage 5$b$ which is open to the atmospheric air.

A heater 7 for heating the cooling medium is arranged for the air-circulating tube passage 5. The electric power is supplied to the heater 7 from the fuel cell via a control unit 8. The control unit 8 controls the heater 7 and the opening degree of the variable damper 6 simultaneously based on an output signal of a temperature sensor 9 arranged in the main cell body 1.

In the arrangement as described above, the opening degree of the variable damper 6 is adjusted on the basis of the output signal of the temperature sensor 9 in a high load operation area in which the temperature of the main cell body 1 is high, and thus the operating temperature is maintained to be appropriate. On the other hand, when the temperature of the main cell body 1 is lowered as the load of the fuel cell is lowered, then the variable damper 6 is closed under the action of the control unit 8 based on the temperature detected by the temperature sensor 9, and the intake of new atmospheric air is stopped. Simultaneously, the control unit 8 operates the heater 7 to raise the temperature of the cooling air flowing through the cooling system 3. Accordingly, the amount of heat, which is required to increase the operating temperature of the main cell body 1, is supplied.

However, in the case of the conventional technique described above, the control reference, which is based on the output signal from the temperature sensor 9 arranged in the main cell body 1, is the proper operating temperature for the fuel cell (power-generating cell unit). Therefore, it is necessary that the control reference is set for each of the individual cell units which constitute the fuel cell stack. Further, the temperature distribution is made in the stacking direction as well as in each of the fuel cells in the main cell body 1. It is necessary to arrange a considerably large number of temperature sensors 9 in order to perform the control accurately. Therefore, the entire arrangement of the fuel cell stack is complicated.

Further, although a part of the temperature-adjusting medium circulates along the air-circulating tube passage 5 of the cooling system 3, the residual part of the temperature-adjusting medium is discharged from the discharge tube passage 5$b$. Therefore, the temperature-adjusting medium having high temperature is released to the outside of the cooling system 3, and the efficiency of increase in temperature of the main cell body 1 is lowered.

SUMMARY OF THE INVENTION

A principal object of the present invention is to provide a fuel cell system which makes it possible to efficiently maintain the operating temperature at a proper temperature with a simple arrangement and simple steps, and a method for operating the fuel cell system.

In the present invention, there are provided a medium-circulating passage for supplying, in a circulating manner, a temperature-adjusting medium into a phosphoric acid fuel cell stack, and first and second temperature sensors for detecting medium temperatures at a medium inlet and a medium outlet of the phosphoric acid fuel cell stack. Accordingly, it is possible to reliably detect, with only the first and second temperature sensors, the balance between the amount of self-heat generation and the amount of heat release of the entire phosphoric acid fuel cell stack, i.e., whether or not the operating temperature of the phosphoric acid fuel cell stack is within a proper operating temperature region. Thus, it is possible to easily simplify the structure.

Further, it is unnecessary to define the judgment reference value (control reference) for each of power-generating cells. It is possible to judge whether or not the entire phosphoric acid fuel cell stack is at the proper operating temperature by only detecting the medium temperatures at the medium inlet and the medium outlet of the phosphoric acid fuel cell stack by using only the first and second temperature sensors. Accordingly, the fuel cell system can be widely utilized in various applications.

Further, the medium-circulating passage is arranged with a pump for circulating the medium, a heater for heating the medium, a heat exchanger for cooling the medium, a bypass passage for bypassing the heat exchanger, and a medium flow passage-switching means for selectively supplying the temperature-adjusting medium to the heat exchanger and the bypass passage.

Accordingly, the temperature-adjusting medium is heated in the medium-circulating passage by the aid of the heater for heating the medium during the low load operation. The heated temperature-adjusting medium circulates through the phosphoric acid fuel cell stack. Thus, the temperature of the phosphoric acid fuel cell stack can be efficiently raised up to a proper operating temperature. During this process, the heated temperature-adjusting medium circulates through the bypass passage without releasing the heat at the heat exchanger. Thus, it is possible to efficiently raise the temperature of the phosphoric acid fuel cell stack.

As described above, the temperature-adjusting medium is selectively supplied to the bypass passage and the heat exchanger installed in the medium-circulating passage, and it circulates through the medium-circulating passage. It is possible to suppress the release of the heat of the temperature-adjusting medium to the minimum. Therefore, it is possible to suppress and minimize the electric power (electric power supplied to the heater for heating the medium) to be used in order to maintain the phosphoric acid fuel cell stack at the proper operating temperature. Further, it is possible to avoid any sudden decrease in temperature of the phosphoric acid fuel cell stack. Thus, it is possible to reliably perform the maintenance of the proper operating temperature even if the low load is used.

On the other hand, when the phosphoric acid fuel cell stack arrives at the proper operating temperature, the supply of the electric power to the heater for heating the medium is stopped. Subsequently, the temperature-adjusting medium, which circulates through the medium-circulating passage, is cooled as it passes through the heat exchanger under the action of the medium flow passage-switching means. Accordingly, it is possible to reliably maintain (cool) the phosphoric acid fuel cell stack to the proper operating temperature.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
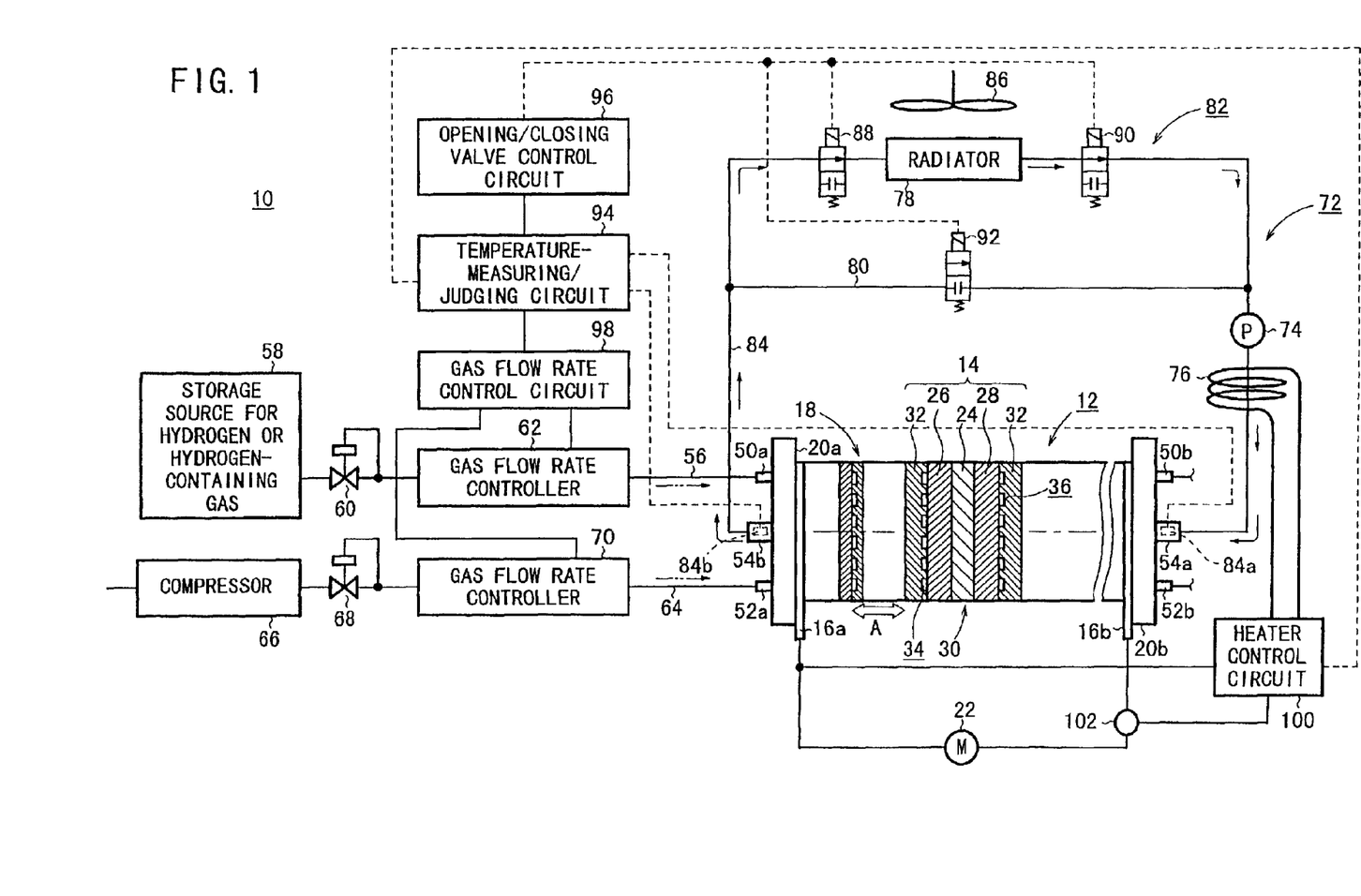
FIG. 1 illustrates a schematic arrangement of a fuel cell system according to an embodiment of the present invention.

FIG. 1 illustrates a schematic arrangement of a fuel cell system 10 according to an embodiment of the present invention.

A fuel cell stack 12, which constitutes the fuel cell system 10, comprises power-generating cells 14. A predetermined number of the power-generating cells 14 are stacked in the direction of the arrow A. Collecting electrodes 16a, 16b electrically connected to the power-generating cells 14 are arranged on both ends of the fuel cell stack 12. A predetermined number of temperature-adjusting cells 18 are interposed between the collecting electrodes 16a, 16b.

End plates 20a, 20b are arranged over the collecting electrodes 16a, 16b with insulating sheets (not shown) intervening therebetween. The end plates 20a, 20b are tightened by means of, for example, unillustrated tie rods. Accordingly, the power-generating cells 14, the collecting electrodes 16a, 16b, and the temperature-adjusting cells 18 are tightened and fixedly arranged in the direction of the arrow A. For example, a load 22 such as a motor is connected to the collecting electrodes 16a, 16b.

Figure 2:
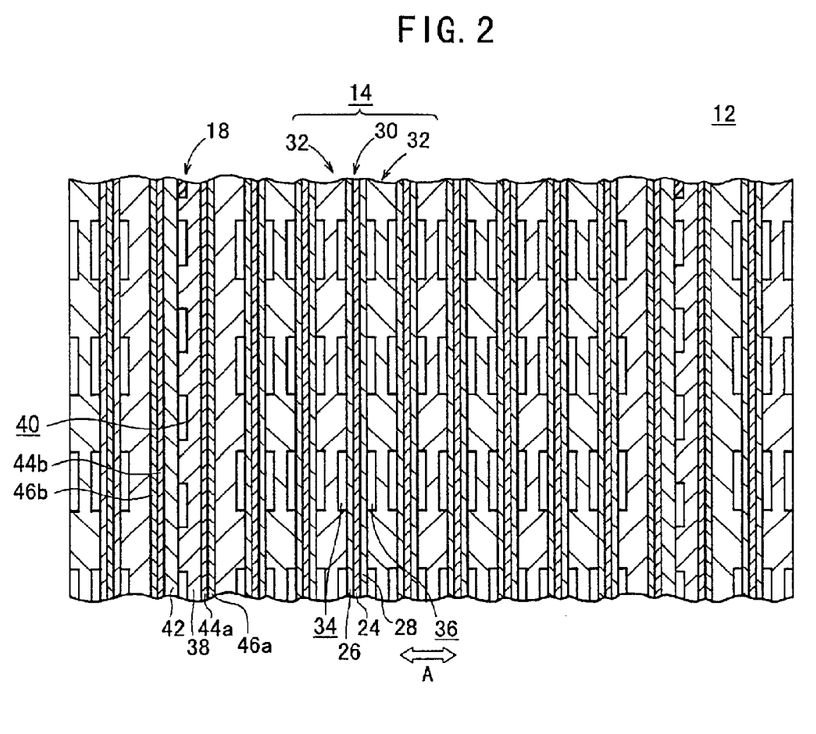
FIG. 2 illustrates an internal structure of a fuel cell stack of the fuel cell system.

The power-generating cell 14 is a phosphoric acid fuel cell (PAFC). The operating (driving) temperature of the power generating cell 14 is about 120° C. to 200° C. As shown in FIGS. 1 and 2, the power-generating cell 14 has a joined unit 30 including an cathode electrode 26 and an anode electrode 28 arranged on both sides of an electrolyte (electrolyte layer) 24 in which phosphoric acid is held by a matrix of a porous material formed of an inorganic material such as SiC or a matrix of basic polymer, especially polybenzimidazole. A porous gas diffusion layer, which is composed of, for example, porous carbon paper, is arranged for each of the cathode electrode 26 and the anode electrode 28. A pair of separators 32 are arranged on both sides of the joined unit 30.

The separator 32 is formed of a conductive material such as a dense carbon material or a metal material. An oxygen-containing gas flow passage 34 is formed on a surface of the separator 32 adjacent to the cathode electrode 26. A fuel gas flow passage 36 is formed on a surface of the separator 32 adjacent to the anode electrode 28. The oxygen-containing gas flow passage 34 and the fuel gas flow passage 36 are provided in the vertical direction while meandering in the horizontal direction.

The temperature-adjusting cell 18 is arranged, for example, at intervals of eight power generating cells 14 in the fuel cell stack 12. As shown in FIG. 2, the temperature-adjusting cell 18 comprises a flow passage plate 38, a lid plate 42 which covers the flow passage plate 38 to form a temperature-adjusting medium passage 40, insulating sheet members 44a, 44b for electrically insulating a temperature-adjusting medium supplied to the temperature-adjusting medium passage 40 from the power-generating cells 14, and conductive plates 46a, 46b for electrically connecting the power-generating cells 14 to one another with the temperature-adjusting cell 18 intervening therebetween.

As shown in FIG. 1, the end plate 20a is provided with a fuel gas inlet 50a for supplying the fuel gas, an oxygen-containing gas inlet 52a for supplying the oxygen-containing gas, and a temperature-adjusting medium outlet 54b for discharging the temperature-adjusting medium. Further, the end plate 20b is provided with a fuel gas outlet 50b for discharging the fuel gas which is not used, an oxygen-containing gas outlet 52b for discharging the oxygen-containing gas which is not used, and a temperature-adjusting medium inlet 54a for supplying the temperature-adjusting medium.

A fuel gas supply passage 56 is connected to the fuel gas inlet 50a. A storage source 58 for storing hydrogen or hydrogen-containing gas, a pressure reducing valve 60, and a gas flow rate controller 62 are arranged for the fuel gas supply passage 56 from the upstream side to the downstream side.

An oxygen-containing gas supply passage 64 is connected to the oxygen-containing gas inlet 52a. A compressor 66, a pressure reducing valve 68, a gas flow rate controller 70 are successively arranged for the oxygen-containing gas supply passage 64 from the upstream side to the downstream side.

The fuel cell stack 12 is connected to a medium-circulating passage 72 which communicates with the temperature-adjusting medium inlet 54a and the temperature-adjusting medium outlet 54b, for supplying, in a circulating manner, the temperature-adjusting medium into the fuel cell stack 12. The medium-circulating passage 72 includes a pump 74 for circulating the temperature-adjusting medium, a heater 76 for heating the temperature-adjusting medium, a radiator (heat exchanger) 78 for cooling the temperature-adjusting medium, a bypass passage 80 for bypassing the radiator 78, and a medium flow passage-switching means 82 for selectively supplying the temperature-adjusting medium to the radiator 78 and the bypass passage 80.

First and second temperature sensors 84a, 84b, which detect the medium temperatures at the temperature-adjusting medium inlet 54a and the temperature-adjusting medium outlet 54b of the fuel cell stack 12, are provided for the medium-circulating passage 72. A cooling fan 86 facing to the radiator 78 is provided. The medium flow passage-switching means 82 is provided with first and second opening/closing valves 88, 90 for making the opening/closing operation on the inlet side and the outlet side of the radiator 78, and a third opening/closing valve 92 for opening/closing the bypass passage 80.

The first and second temperature sensors 84a, 84b are connected to a temperature-measuring/judging circuit 94. The temperature-measuring/judging circuit 94 outputs signals to control an opening/closing valve control circuit 96, a gas flow rate control circuit 98, and a heater control circuit 100. The opening/closing valve control circuit 96 controls the first to third opening/closing valves 88, 90, 92. The gas flow rate control circuit 98 controls the gas flow rate controllers 62, 70. The heater control circuit 100 controls the heater 76. Specifically, the heater control circuit 100 controls an electric power distributor 102 so that the electric power generated by the fuel cell stack 12 is supplied to the heater 76.

Next, an operation of the fuel cell system 10, i.e., a method of operating the fuel cell system 10 according to the present invention will be described with reference to Table 1 and a timing chart shown in FIG. 3.

At first, hydrogen or the hydrogen-containing gas is supplied as the fuel gas from the storage source 58 to the fuel gas supply passage 56. The fuel gas is supplied from the fuel gas inlet 50a into the fuel cell stack 12. Oxygen-containing gas such as air is supplied to the oxygen-containing gas supply passage 64 by the aid of the compressor 66. The oxygen-containing gas is supplied from the oxygen-containing gas inlet 52a into the fuel cell stack 12. Further, the temperature-adjusting medium is supplied into the fuel cell stack 12 from the medium-circulating passage 72 via the temperature-adjusting medium inlet 54a.

The fuel gas, which is supplied to the fuel gas inlet 50a of the end plate 20a, is supplied to the fuel gas flow passage 36 formed in the separator 32. The fuel gas moves in the direction of the gravity while meandering in the horizontal direction along the fuel gas flow passage 36. During this process, the hydrogen gas in the fuel gas is supplied to the anode electrode 28 of the power-generating cell 14. The fuel gas, which is not used, is discharged from the fuel gas outlet 50b provided for the end plate 20b.

On the other hand, the oxygen-containing gas, which is supplied to the oxygen-containing gas inlet 52a of the end plate 20a, is introduced into the oxygen-containing gas flow passage 34 formed in the separator 32. The oxygen-containing gas moves in the direction of the gravity while meandering in the horizontal direction along the oxygen-containing gas flow passage 34. During this process, the oxygen gas in the air is supplied to the cathode electrode 26. The air, which is not used, is discharged from the oxygen-containing gas outlet 52b provided for the end plate 20b. Accordingly, the electric power is generated by the power-generating cell 14, and the electric power is supplied to the load 22 such as a motor.

Figure 3:
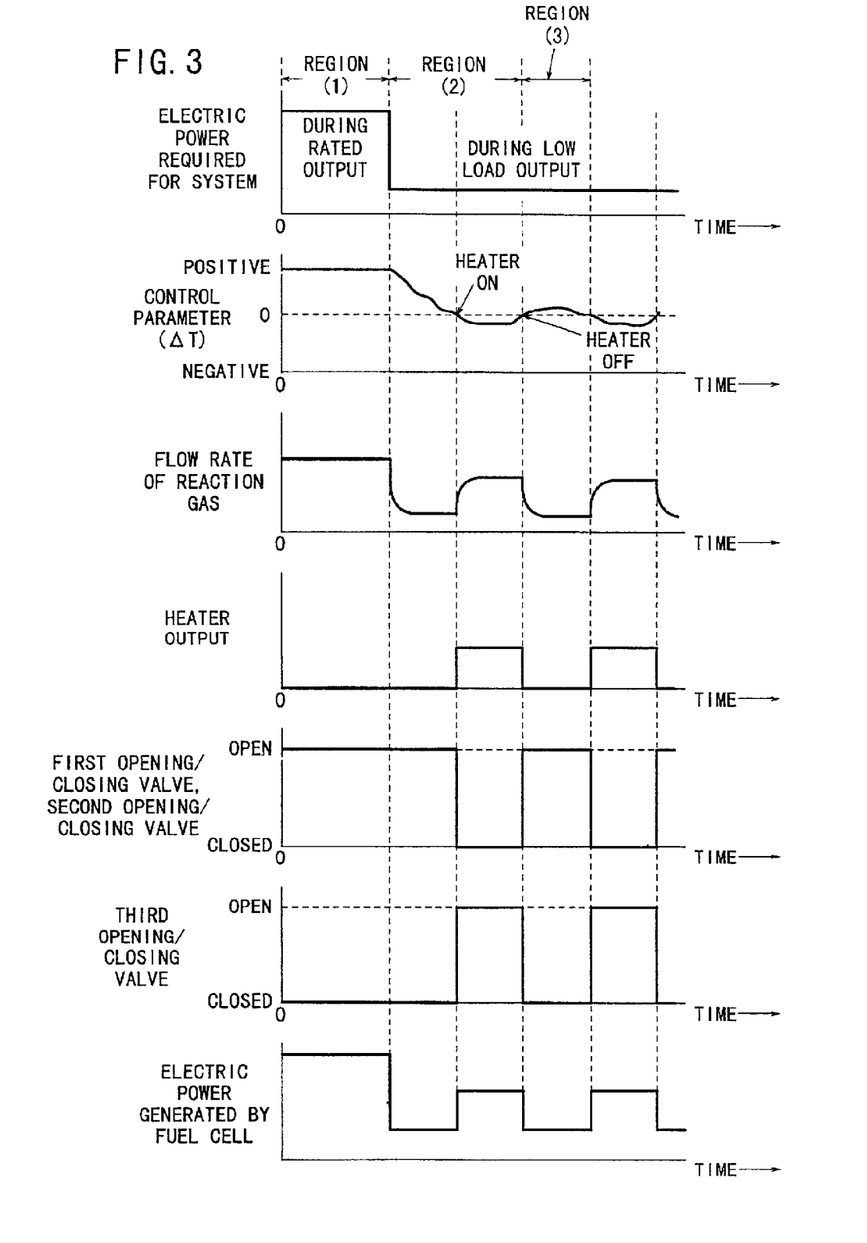
FIG. 3 is a timing chart illustrating a method for operating the fuel cell system.

The operation as described above is performed during the rated load operation (during the rated output) shown in the region (1) in FIG. 3 or during the high load operation exceeding the rated load operation, in which the amount of self-heat generation of the fuel cell stack 12 is larger than the amount of heat release, and the temperature of the entire fuel cell stack 12 is increased. Therefore, the temperature-adjusting medium is introduced from the temperature-adjusting medium inlet 54a into the fuel cell stack 12, and it deprives the excessive heat in the fuel cell stack 12. Then, the temperature-adjusting medium is discharged from the temperature-adjusting medium outlet 54b. Accordingly, the temperature is adjusted so that the interior of the fuel cell stack 12 is kept at a proper operating temperature.

During this process, the temperature of the temperature-adjusting medium is increased. Therefore, the medium temperature on the side of the temperature-adjusting medium outlet 54b is higher than the medium temperature on the side of the temperature-adjusting medium inlet 54a. The difference $\Delta T$ in medium temperature has a positive value. In the embodiment of the present invention, the difference $\Delta T$ in medium temperature is used as a control parameter. The temperature of the fuel cell stack 12 is controlled by determining whether the difference $\Delta T$ in medium temperature is greater than 0 or not.

TABLE 1

| | Reaction gas flow rate | Heater 76 | First and second opening/closing valves 88, 90 | Third opening/closing valve 92 |
| --- | --- | --- | --- | --- |
| ΔT > 0 | large | OFF | open | closed |
| ΔT ≦ 0 | small | ON | closed | open |

As shown in FIG. 3 and Table 1, the flow rates of the reaction gases as the fuel gas and the oxygen-containing gas are increased. Further, the first and second opening/closing valves 88, 90 of the medium flow passage-switching means 82 are opened. The third opening/closing valve 92 is closed. Accordingly, the radiator 78 communicates with the medium-circulating passage 72. The temperature-adjusting medium, which is discharged from the temperature-adjusting medium outlet 54b, passes through the radiator 78. Thus, the heat is released to the outside, and the temperature-adjusting medium is cooled. After that, the temperature-adjusting medium is supplied from the temperature-adjusting medium inlet 54a into the fuel cell stack 12. Therefore, the fuel cell stack 12 can be maintained at the proper operating temperature during the rated output.

On the other hand, as shown in the region (2) in FIG. 3, when the electric power required for the fuel cell system 10 is decreased, and the fuel cell stack 12 is shifted to the low load operation (process of the low load output), then the amount of self-heat generation of the fuel cell stack 12 is decreased. Accordingly, the temperature of the fuel cell stack 12 is gradually lowered. During this process, the amount of heat exchange between the temperature-adjusting medium introduced from the temperature-adjusting medium inlet 54a into the fuel cell stack 12 and the power-generating cells 14 of the fuel cell stack 12 is decreased. The temperature of the temperature-adjusting medium is not significantly increased.

Therefore, the temperature-adjusting medium having a relatively low temperature, which is discharged from the temperature-adjusting medium outlet 54b, is cooled by the radiator 78, and then it is introduced from the temperature-adjusting medium inlet 54a into the fuel cell stack 12. The heat is absorbed from the power-generating cells 14. During this process, the temperature difference in medium temperature detected by the first and second temperature sensors 84a, 84b, i.e., the difference ΔT in medium temperature as the control parameter is gradually decreased, and it is shifted from 0 to a negative value.

The detection signals of the first and second temperature sensors 84a, 84b are sent to the temperature-measuring/judging circuit 94. When the temperature-measuring/judging circuit 94 detects that the difference ΔT in medium temperature of the temperature-adjusting medium is decreased from the positive value to be 0, a command signal is simultaneously sent to the heater control circuit 100, the gas flow rate control circuit 98, and the opening/closing valve control circuit 96. The heater control circuit 100 controls the fuel cell stack 12 to supply the electric power to the heater 76 installed for the medium-circulating passage 72. The temperature-adjusting medium is heated by the heater 76 just before it is introduced into the temperature-adjusting medium inlet 54a.

A command is given to the gas flow rate control circuit 98 to supply fuel gas and oxygen-containing gas to the fuel cell stack 12. Specifically, the gas flow rate control circuit 98 controls the gas flow rate controllers 62, 70 to supply the fuel gas and oxygen-containing gas necessary to generate the sufficient electric power in the fuel cell stack 12. The fuel cell stack 12 supplies the electric power to the fuel cell system 10 and the heater 76.

Figure 4:
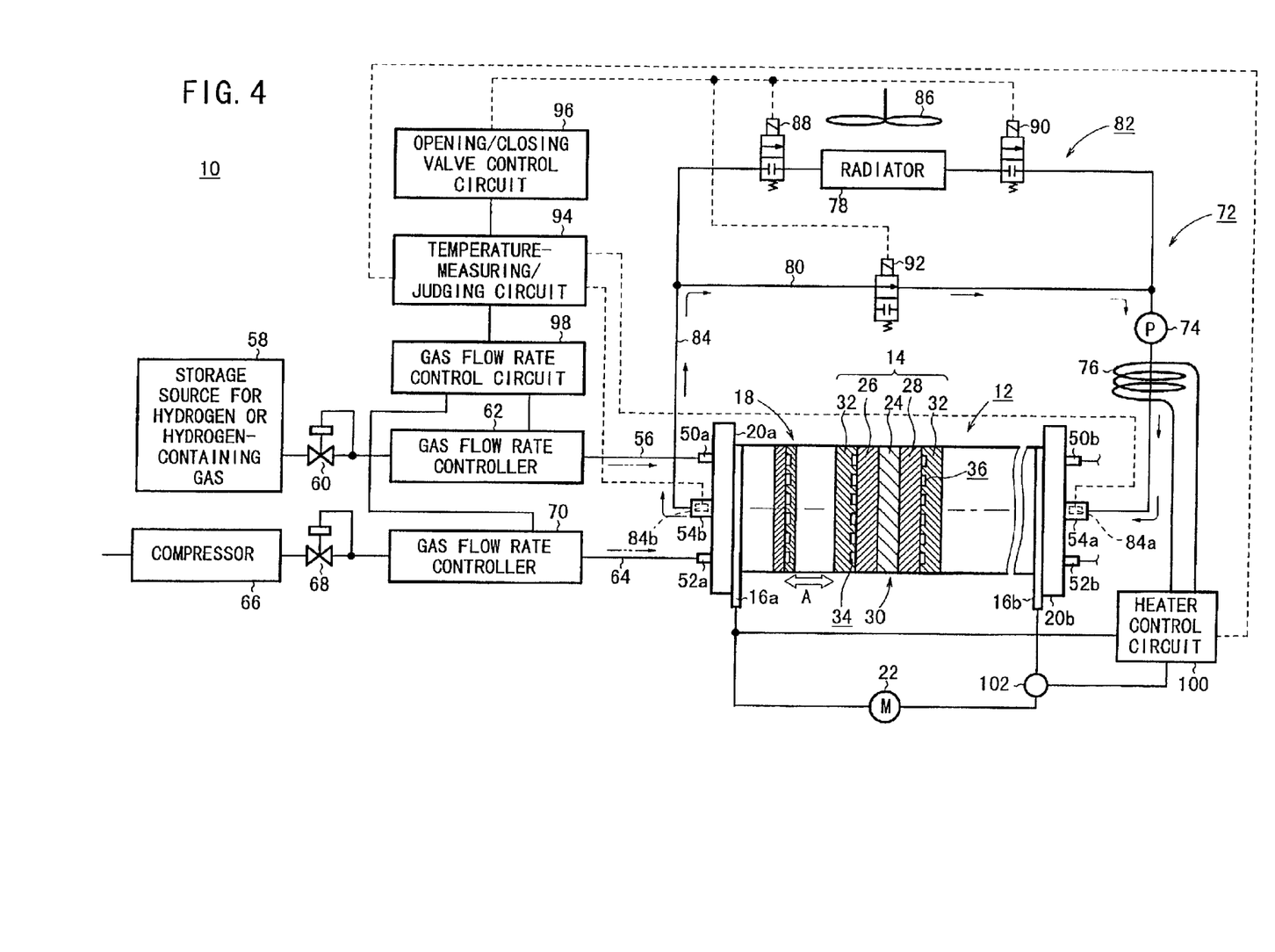
FIG. 4 illustrates the operation of the fuel cell system.

A command is given to the opening/closing valve control circuit 96 to close the first and second opening/closing valves 88, 90 and open the third opening/closing valve 92. Therefore, as shown in FIG. 4, the temperature-adjusting medium does not pass through the radiator 78, but it passes through the bypass passage 80. The temperature-adjusting medium circulates into the fuel cell stack 12. Further, the temperature-adjusting medium is heated by the heater 76 to raise the temperature of the fuel cell stack 12.

Subsequently, as shown in the region (3) in FIG. 3, when the temperature of the fuel cell stack 12 is increased, and the difference ΔT in medium temperature is increased from the negative value to the value greater than 0, then the temperature-measuring/judging circuit 94 sends a command signal to the heater control circuit 100, the gas flow rate control circuit 98, and the opening/closing valve control circuit 96. Accordingly, the supply of the electric power to the heater 76 is stopped by the aid of the heater control circuit 100. Further, the supply amounts of the fuel gas and the oxygen-containing gas are decreased to be amounts corresponding to the required output of the fuel cell system 10 by the aid of the gas flow rate control circuit 98. Further, the first and second opening/closing valves 88, 90 are opened, and the third opening/closing valve 92 is closed. The passage for the temperature-adjusting medium is switched to the passage passing through the radiator 78.

As described above, in the embodiment of the present invention, the first and second temperature sensors 84a, 84b are arranged for the temperature-adjusting medium inlet 54a and the temperature-adjusting medium outlet 54b of the fuel cell stack 12. Accordingly, it is possible to detect the balance between the amount of self-heat generation of the fuel cell stack 12 and the amount of heat release from the fuel cell stack 12, i.e., whether or not the operating temperature of the fuel cell stack 12 is within the proper operating temperature region. Therefore, it is unnecessary to define any judgment reference value for each of the power-generating cells 14. It is possible to reliably judge whether or not the entire fuel cell stack 12 is at the proper operating temperature by using only the first and second temperature sensors 84a, 84b. With the simple structure, the fuel cell stack 12 can be widely utilized in various applications.

Further, in the embodiment of the present invention, the temperature-adjusting medium circulates only in the medium-circulating passage 72. The temperature-adjusting medium is not discharged to the medium-circulating passage 72, and no new temperature-adjusting medium is supplied to the medium-circulating passage 72. That is, the heat release treatment is merely optionally applied by selectively supplying the temperature-adjusting medium to the bypass passage 80 and the radiator 78 arranged for the medium-circulating passage 72. Accordingly, the temperature-adjusting medium is heated by the aid of the heater 76 in the state in which the heat release from the temperature-adjusting medium is suppressed to the minimum. Thus, the electric power (electric power supplied to the heater 76), which is used to retain the fuel cell stack 12 at the proper operating temperature, can be suppressed to the minimum.

Further, the sudden decrease in temperature of the fuel cell stack 12 is effectively avoided, and the proper operating temperature is reliably kept during the low load operation. Especially, the operation of the fuel cell system 10 is controlled by using the control parameter of the difference ΔT in medium temperature between the temperature-adjusting medium outlet 54b and the temperature-adjusting medium inlet 54a of the fuel cell stack 12. Accordingly, the fuel cell stack 12 can be highly accurately maintained at the proper operating temperature in accordance with the simple control. The power generation is reliably performed in a well-suited manner by the aid of the fuel cell stack 12.

The fuel cell system according to the present invention includes the first and second temperature sensors for detecting the medium temperatures at the medium inlet and the medium outlet of the phosphoric acid fuel cell stack. Accordingly, it is possible, with the simple structure, to reliably detect whether or not the operating temperature of the phosphoric acid fuel cell stack is within the proper operating temperature region. Therefore, the fuel cell system can be widely utilized in various applications.

Further, the temperature-adjusting medium circulating in the medium-circulating passage is selectively supplied to the heat exchanger and the bypass passage. Accordingly, it is possible to suppress the heat release from the temperature-adjusting medium to the minimum. It is possible to reliably keep the phosphoric acid fuel cell stack at the proper operating temperature with the minimum electric power.

The method for operating the fuel cell system according to the present invention uses the control parameter of the value obtained by subtracting the medium temperature at the medium inlet from the medium temperature at the medium outlet of the phosphoric acid fuel cell stack. Accordingly, even in the case of the low load operation of the phosphoric acid fuel cell stack, the operating temperature of the phosphoric acid fuel cell stack can be efficiently maintained at the proper operating temperature in accordance with the simple control.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising:
   a phosphoric acid fuel cell stack including a plurality of stacked power-generating cells each having a joined unit including an electrolyte impregnated with phosphoric acid and interposed between an anode electrode and a cathode electrode, said joined unit being interposed between separators;
   a medium-circulating passage communicating with a medium inlet and a medium outlet of said phosphoric acid fuel cell stack, for supplying, in a circulating manner, a temperature-adjusting medium into said phosphoric acid fuel cell stack; and
   first and second temperature sensors for detecting medium temperatures at said medium inlet and said medium outlet,
   wherein said medium-circulating passage is arranged with:
   a pump for circulating said medium;
   a heater for heating said medium;
   a heat exchanger for cooling said medium;
   a bypass passage for bypassing said heat exchanger; and
   medium flow passage-switching means for selectively supplying said temperature-adjusting medium to said heat exchanger and said bypass passage.

2. The fuel cell system according to claim 1, wherein said medium flow passage-switching means comprises:
   first and second opening/closing valves for performing opening/closing operation on an inlet side and an outlet side of said heat exchanger; and
   a third opening/closing valve for opening/closing said bypass passage.

3. The fuel cell system according to claim 1,
   wherein a fuel gas inlet, an oxygen-containing gas inlet, and said medium outlet are provided on a first end side in a stacking direction of said phosphoric acid fuel cell stack, and
   wherein a fuel gas outlet, an oxygen-containing gas outlet, and said medium inlet are provided on a second end side in said stacking direction of said phosphoric acid fuel cell stack.

4. The fuel cell system according to claim 1,
   wherein a temperature-adjusting cell is installed with a plurality of said intervening power-generating cells in said phosphoric acid fuel cell stack, and
   wherein a temperature-adjusting medium passage for supplying said temperature-adjusting medium, which is electrically insulated from said power-generating cells, is provided for said temperature-adjusting cell.

5. The fuel cell system according to claim 1, further comprising:
   a temperature-measuring/judging circuit connected to said first and second temperature sensors;
   an opening/closing valve control circuit for controlling said medium flow passage-switching means;
   a gas flow rate control circuit for controlling flow rates of fuel gas and oxygen-containing gas to be supplied to said phosphoric acid fuel cell stack; and
   a heater control circuit for controlling said heater,
   wherein said opening/closing valve control circuit, said gas flow rate control circuit, and said heater control circuit are controlled on the basis of a signal processed by said temperature-measuring/judging circuit.

6. The fuel cell system according to claim 5,
   wherein electric power generated by said phosphoric acid fuel cell stack is supplied to said heater by said heater control circuit by the aid of an electric power distributor.

7. A method for operating a fuel cell system which comprises a medium-circulating passage communicating with a medium inlet and a medium outlet of a phosphoric acid fuel cell stack, for supplying a temperature-adjusting medium into said phosphoric acid fuel cell stack and in which said medium-circulating passage is arranged with a pump for circulating said medium, a heater for heating said medium, a heat exchanger for cooling said medium, and a bypass passage for bypassing said heat exchanger, said method comprising the steps of:
   supplying, in a circulating manner, said temperature-adjusting medium into said phosphoric acid fuel cell stack and detecting a medium temperature of said phosphoric acid fuel cell stack at said medium inlet and a medium temperature of said phosphoric acid fuel cell stack at said medium outlet; and
   supplying said temperature-adjusting medium to said bypass passage without supplying said temperature-adjusting medium to said heat exchanger and supplying electric power to said heater from power-generating cells in said phosphoric acid fuel cell stack to heat said temperature-adjusting medium, when a value, which is obtained by subtracting said medium temperature at said medium inlet from said medium temperature at said medium outlet, is not more than 0.

* * * * *